US008786660B2

(12) United States Patent
Lyu

(10) Patent No.: US 8,786,660 B2
(45) Date of Patent: Jul. 22, 2014

(54) VIDEO CALL METHOD AND SYSTEM THEREOF

(75) Inventor: Chungnan Lyu, Saratoga, CA (US)

(73) Assignee: Raycomm Technologies, Inc., Jiangsu (CN)

( * ) Notice: Subject to any disclaimer, the term of this patent is extended or adjusted under 35 U.S.C. 154(b) by 202 days.

(21) Appl. No.: 13/050,204

(22) Filed: Mar. 17, 2011

(65) Prior Publication Data
US 2012/0154507 A1 Jun. 21, 2012

Related U.S. Application Data

(60) Provisional application No. 61/459,845, filed on Dec. 20, 2010.

(51) Int. Cl.
H04N 7/14 (2006.01)

(52) U.S. Cl.
USPC ........................................ 348/14.01; 370/338

(58) Field of Classification Search
USPC ............... 348/14.01–14.08, 14.09; 455/550.1
See application file for complete search history.

(56) References Cited

U.S. PATENT DOCUMENTS

| 2001/0017667 | A1* | 8/2001 | Frink et al. | 348/458 |
|---|---|---|---|---|
| 2002/0112242 | A1* | 8/2002 | Meddaugh et al. | 725/78 |
| 2004/0032847 | A1* | 2/2004 | Cain | 370/338 |
| 2006/0233184 | A1* | 10/2006 | Stanforth | 370/401 |
| 2011/0288884 | A1* | 11/2011 | Algoo et al. | 705/3 |
| 2012/0056971 | A1* | 3/2012 | Kumar et al. | 348/14.02 |

* cited by examiner

Primary Examiner — Maria El-Zoobi
(74) Attorney, Agent, or Firm — Huffman Law Group, PC

(57) ABSTRACT

A video call method is disclosed herein and includes the following steps. The step of installing a high definition video call router (HDVCR) program in at least two mobile devices; the step of activating the HDVCR program in one of the mobile devices to start a video call; the step of connecting the at least two mobile devices; the step of enabling at least two routers by the HDVCR program to search for each other over Internet; the step of transmitting a plurality of video streams between the at least two routers; and the step of sending a plurality of high definition video images respectively to at least two displays from the at least two routers.

14 Claims, 3 Drawing Sheets

VIDEO CALL METHOD AND SYSTEM THEREOF

RELATED APPLICATIONS

This application claims priority to, and herein incorporates by reference, U.S. provisional patent application No. 61/459,845, filed Dec. 20, 2010, entitled "High definition video call router (HDVCR)."

BACKGROUND OF THE INVENTION

1. Field of the Invention

The present invention is related to a video call method and system thereof, and more particularly related to a high definition video call method and system thereof.

2. Description of the Prior Art

Because high speed telephone communication protocol (such as $3^{rd}$ Generation Communication (W-CDMA, CDMA2000, TDS-CDMA and so on)) is now available in public market, video call is one of the significant applications implemented in large bandwidth broadcast. However, the screen of the mobile device or portable device is too tiny to be seen and the resolution of video call is so poor.

FIG. 1 is a view illustrating a conventional video call method in prior art. As shown in FIG. 1, when a user uses a first mobile device 102 to make a video call to another user with a second mobile device 104, the video call function will be enabled by the first mobile device 102 to establish the connection between the first mobile device 102 and the second mobile device 104. When the connection between the first user 102 and the second user 104 is established, the video streams and the audio voice streams can be communicated between the first mobile device 102 and the second mobile device 104. However, the bandwidth of the mobile communication is still not good enough to make a high quality video call, and the video images shown on the screen of the mobile devices are fuzzy and lagged. It is difficult for the user to see the clear and high quality video by utilizing the mobile communication.

According to the description above, a need continues to exist for a video call method and system thereof to synchronizedly display a HD video on a portable device and a remote display.

SUMMARY OF THE INVENTION

In view of foregoing, one object of the present invention is to develop a video call system for displaying high definition video images on a remote display.

This object is given only by way of illustrative example. Thus, other desirable objectives and advantages inherently achieved by the disclosed invention may occur or become apparent to those skilled in the art. The invention is defined by the appended claims.

According to one aspect of the invention, a video call method is disclosed in the present invention and includes the following steps: installing a high definition video call router (HDVCR) program in at least two mobile devices; activating the HDVCR program in one of the mobile devices to start a video call; connecting the at least two mobile devices; the HDVCR program enabling at least two routers to search for each other over Internet; transmitting a plurality of video streams between the at least two routers; and sending a plurality of high definition video images respectively to at least two displays from the at least two routers.

There is a video call system in the present invention disclosed herein. The video call system includes a high definition video call router (HDVCR) program, at least two routers and at least two displays. The high definition video call router (HDVCR) program is installed in at least two mobile devices and configured to start a video call. Each of the at least two routers is activated by the HDVCR program to communicate with another router over an Internet connection. Each of the displays is connected to one of the routers via wire or wirelessly. A plurality of audio streams are transmitted between the at least two mobile devices, and a plurality of video streams are transmitted between the at least two routers and displayed on the at least two displays.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

The following detailed description of the present invention describes a video call method and system thereof necessary to provide an understanding of the present invention, but does not cover a complete structure composition and the operating theory. The portions relating to the conventional techniques are briefly described, and the parts of the drawings are not proportionally drafted. While embodiments are discussed, it is not intended to limit the scope of the present invention. Except expressly restricting the amount of the components, it is appreciated that the quantity of the disclosed components may be greater than that disclosed.

Figure 1:
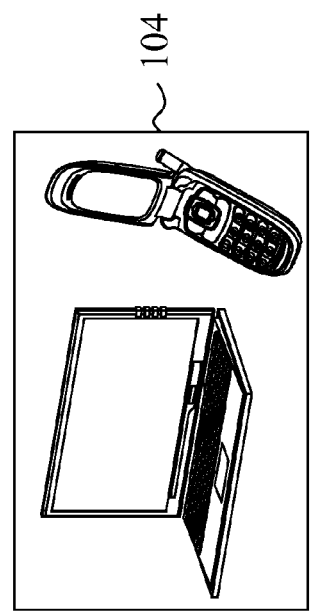
FIG. 1 is a view illustrating a conventional video call method in prior art.
Figure 2:
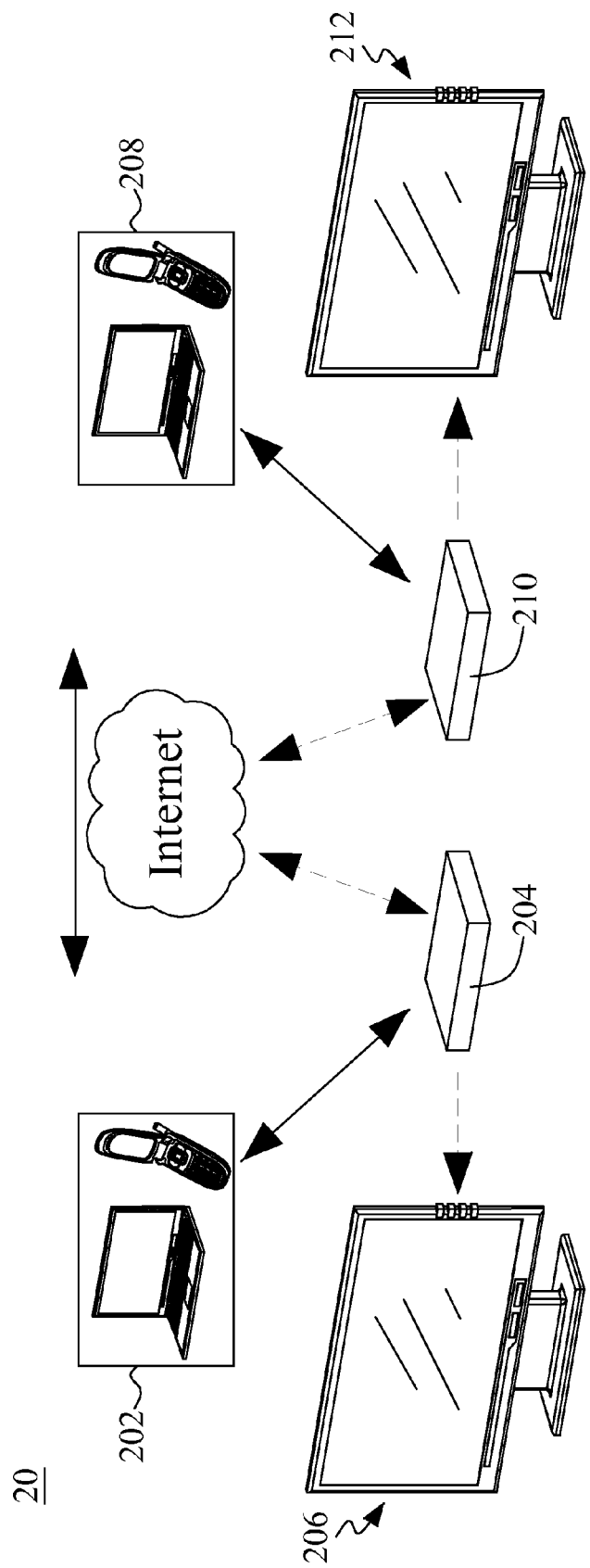
FIG. 2 is a view illustrating a video call system in the present invention.

FIG. 2 is a view illustrating a video call system in the present invention. As shown in FIG. 2, the video call system 20 includes a first mobile device 202, a first router 204, a first display 206, a second mobile device 208, a second router 210 and a second display 212. There is a high definition video call router (HDVCR) program embedded/installed in the first mobile device 202 and the second mobile device 208. It should be noted, in the present embodiment, the high definition video call router (HDVCR) program is implemented by a hardware, firmware or software program mechanism, and the application can be installed on the mobile device and display a "HDVCR" widget on the mobile device display panel. The first mobile device 202 and the second mobile device 208 implemented in the present invention include but not limited to cellular phones and smart phones, capable of Internet capabilities through WIFI connection via a typical WIFI LAN router. The first router 204 and the second router 208 send a plurality of high definition images to the first display 206 and the second display 212, respectively, via wire or wirelessly. The first mobile device 202 is able to enable the first router 204 to search the second router 210 in the location of the second mobile device 208. Therefore, the video streams are communicated between the first router 204 and the second router 210, and the audio streams are communicated between the first mobile device 202 and the second mobile device 208. Because the video streams are communicated by the first router 204 and the second router 210 through Internet with large broadcast bandwidth, the high definition video images in the present invention can be transmitted without any delay, and the HD video images can be displayed on the first display 206 and the second display 212.

It should be noted that the first router 204 and the second router 210 are WIFI routers as well as video encoding/decoding engines, and the first router 204 and the second router 210 can encode/decode HD video streams and send the encode video stream to Internet and display the decoded stream over a remote display such as HD TV. The video call system 20 in the present invention can work straight forward, and there is no need to set up an account or a screen name (such as SKYPE, YAHOO messenger, MSN messenger and so on . . . ) in the present invention. The HDVCR program in the present invention can automatically or manually adjust the resolution and/or frame rates of the first display 206 and the second display 212. It should be noted, in the present embodiment, there are two mobile devices, two routers and two displays implemented in the present invention but not limited to only two mobile devices, two routers and two displays. In a different embodiment, there are more than two mobile devices, two routers and two displays able to be used in the video call system 20 of the present invention.

When a user would like to make a video call, the user uses the conventional cell phone calling function in the first mobile device 202 to call the other user with the second mobile device 204. As the connection between the first mobile device 202 and the second mobile device 208 is established, the HDVCR program in the first mobile device 202 will start to activate the first router 204 to search the second router 210 over Internet to establish a connection between the first router 204 and the second router 210. The video streams of the user and the other user are decoded by the first router 204 and the second router 210 so as to display the video images on the first display 206 and the second display 212. Because the bandwidth of Internet is much larger than the bandwidth of the cellular network, the video images shown in the first display 206 and the second display 212 are clear with no lag.

Figure 3:
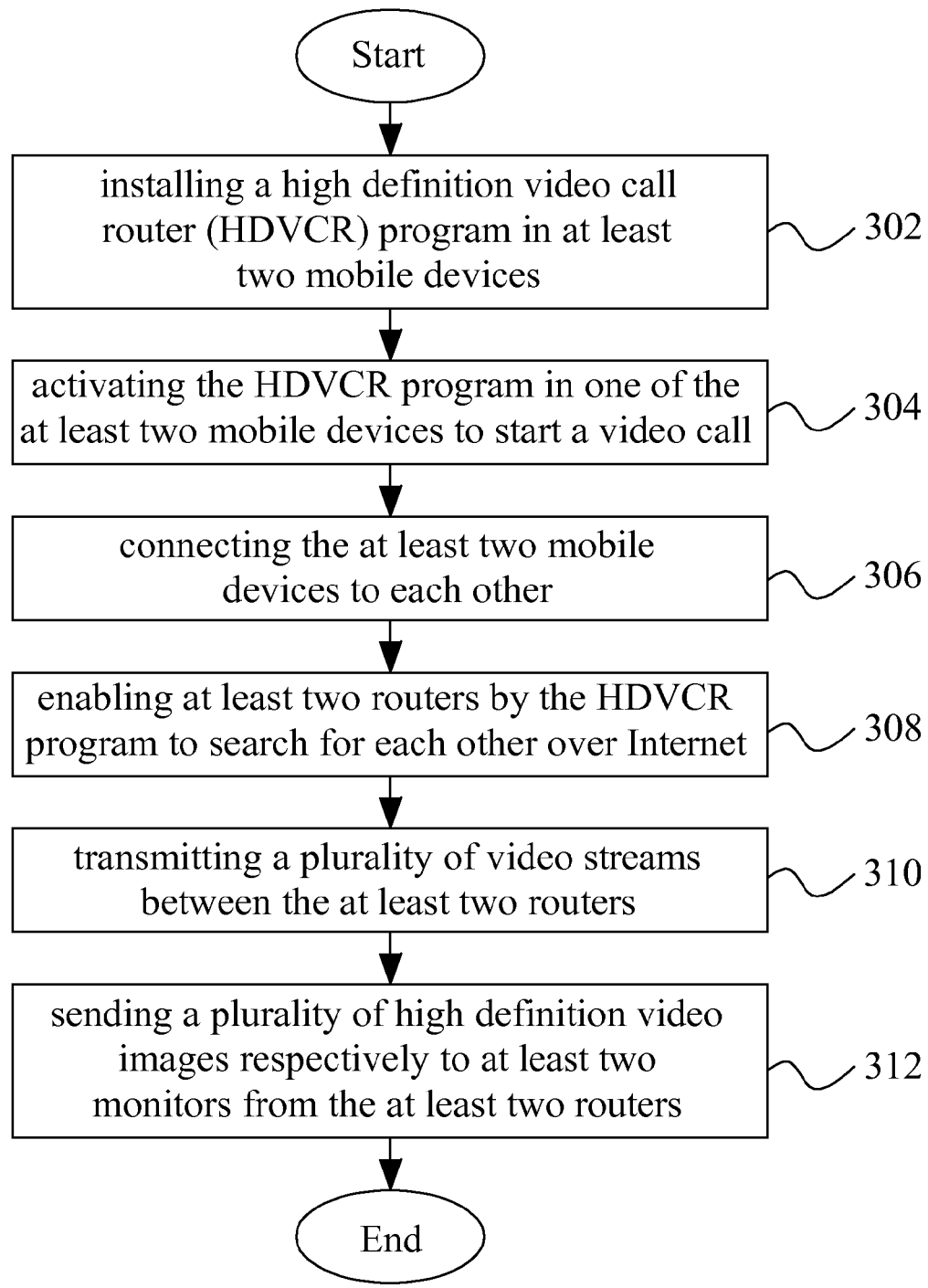
FIG. 3 is a flow chart illustrating the video call method.

FIG. 3 is a flow chart illustrating the video call method. As shown in FIG. 3, in step 302, the HDVCR program is installed respectively in the first mobile device and the second mobile device. The HDVCR program is like a widget displayed on the first mobile device panel and the second mobile device panel and is configured to switch on and off the video conference function. In step 304, a HDVCR program is activated in a first mobile device when a user would like to make a video phone call to his friend. In step 306, the HDVCR program in the first mobile device will try to connect another HDVCR program in the second mobile device. Therefore, the audio stream can be transmitted between the first mobile device and the second mobile device. In step 308, the HDVCR program in the first mobile device will enable the first router to search the second router over Internet. In step 310, the video streams are decoded and then transmitted between the first router and the second router. In step 312, the video streams are respectively transmitted to the first display and the second display and the high definition video images are displayed on the first display and the second display. It should be noted that the video call method and system in the present invention can be implemented with more than two mobile devices and two routers, and it is able to establish a video conferencing call among several people. The first mobile device, the first router and the first display are in the same location. The second mobile device, the second router and the second display are also in the same location. The first display and the second display can be large scale liquid crystal displays (LCD) with High Definition video resolution. In a different embodiment, the video call method in the present invention further includes a step of automatically or manually adjusting the resolution/frame rate over the first display and the second display in accordance with Internet connection bandwidth.

Although specific embodiments have been illustrated and described, it will be appreciated by those skilled in the art that various modifications may be made without departing from the scope of the present invention, which is intended to be limited solely by the appended claims.

What is claimed is:

1. A video call method, comprising:
    installing a high definition video call router (HDVCR) program in at least two mobile devices;
    activating the HDVCR program in one of the mobile devices to start a video call;
    connecting the at least two mobile devices;
    enabling at least two WIFI routers by the HDVCR program to search for each other over Internet;
    decoding a plurality of video streams by the at least two WIFI routers with high definition video encoder/decoder engine;
    transmitting the plurality of video streams between the at least two WIFI routers; and
    sending a plurality of high definition video images respectively to at least two displays from the at least two WIFI routers.

2. The video call method of claim 1, wherein a plurality of audio streams are communicated between the at least two mobile devices.

3. The video call method of claim 1, wherein the installing step includes setting up WIFI connection between the at least two WIFI routers and the at least two mobile devices.

4. The video call method of claim 1, wherein the plurality of high definition images are sent to the at least two displays from the at least two WIFI routers via wire or wireless.

5. The video call method of claim 1, wherein the HDVCR program is a widget displayed on each of the al least two mobile devices and configured to switch on and off a video conference function.

6. The video call method of claim 1 further comprising automatically or manually adjusting a resolution/frame rate on the at least two displays in accordance with Internet connection bandwidth.

7. A video call system, comprising:
    a high definition video call router (HDVCR) program installed in at least two mobile devices and configured to start a video call;
    at least two routers, one of the at least two routers is activated by the HDVCR program to communicate with the another router over Internet,
    wherein the at least two routers are WIFI routers with high definition video encoder/decoder engine; and
    at least two displays, each of the displays is connected to one of the router via wire or wireless;
    wherein a plurality of audio streams are transmitted between the at least two mobile devices, and a plurality of video streams are transmitted between the at least two routers and displayed on the at least two displays.

8. The video call system of claim 7, wherein a resolution/frame rate of the video call in each one of the displays is adjustable.

9. The video call system of claim 7, wherein the at least two mobile devices are smart phones, capable of Internet capabilities through WIFI connection via the at least two WIFI routers.

10. The video call system of claim 7, wherein the at least two mobile devices are smart phones.

11. The video call system of claim 7, wherein the HDVCR program is a widget displayed on the at least two mobile devices and configured to switch on and off a video conference function.

12. The video call system of claim 7, wherein the HDVCR program is a software installed in the mobile devices.

13. The video call system of claim 7, wherein the HDVCR program is a firmware embedded in the mobile devices.

14. The video call system of claim 7, wherein the mobile devices include WIFI connection.

* * * * *